(No Model.)
E. LYON.
PACKING AND STORING VESSEL.
No. 358,863. Patented Mar. 8, 1887.
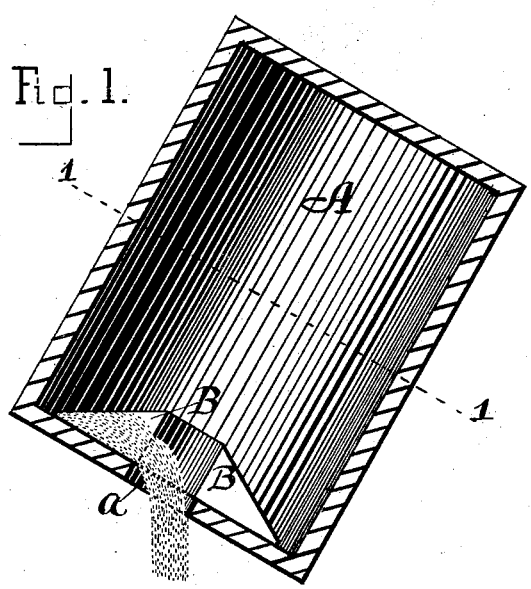
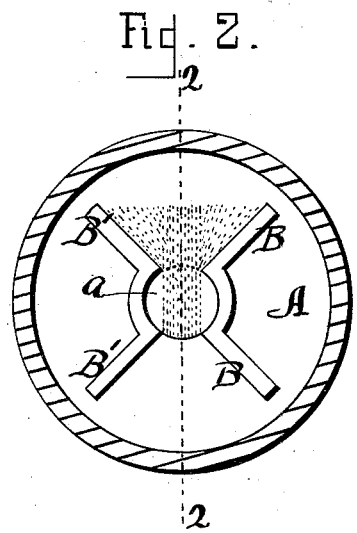
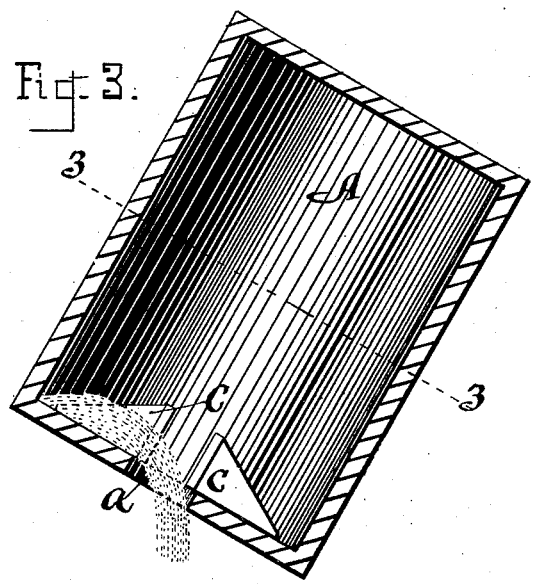
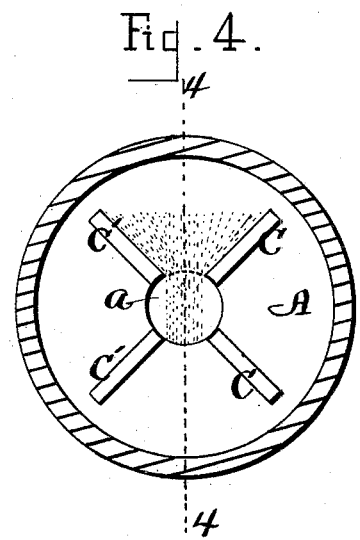
Witnesses:
Wm H. Chapin
A. S. Montgomery
Inventor:
Edmund Lyon

UNITED STATES PATENT OFFICE.

EDMUND LYON, OF ROCHESTER, NEW YORK.

PACKING AND STORING VESSEL.

SPECIFICATION forming part of Letters Patent No. 358,863, dated March 8, 1887.

Application filed March 22, 1886. Serial No. 196,182. (No model.)

*To all whom it may concern:*

Be it known that I, EDMUND LYON, a citizen of the United States, residing at Rochester, Monroe county, and State of New York, have invented certain new and useful Improvements in Packing and Storing Vessels, of which the following is a specification.

My invention relates to improvements in the construction of packing and storing vessels which are emptied by means of an opening in the side or end thereof; and the object is to provide a way whereby the emptying of such vessels may be thoroughly and speedily accomplished. I attain this object by permanently attaching guides to the inside of the vessel in juxtaposition to the opening, as illustrated in the accompanying drawings, in which—

Figure 1 is a central longitudinal section of a vessel with my improvement on line 2 2 of Fig. 2. Fig. 2 is a cross-section on line 1 1 of Fig. 1. Fig. 3 is a central longitudinal section of a vessel with my improvement on line 4 4 of Fig. 4. Fig. 4 is a cross-section on line 3 3 of Fig. 3.

Similar letters refer to similar parts throughout the several views.

A represents a cylindrical vessel having the opening $a$ in one end. Attached to the inside of the vessel on opposite sides of the opening $a$, with their apexes pointing toward it, are two V-shaped guides, B B'. The apexes of these guides are flush with the circumference of the opening, and, if desired, may be concave, so as to conform perfectly to it.

I consider it preferable to have the sides of the guides substantially perpendicular to the side of the vessel to which they are attached, and to have them radiate from the opening in straight lines; but, if desired, guides set at a different angle with the side of the vessel to which they are attached, or having curved or irregularly-shaped sides, might be employed with a similar result.

Such being the construction of my invention, the manner of its use will be readily understood. After the vessel has discharged the greater portion of its contents in the usual way, the vessel is tipped or tilted on line 2 2 of Fig. 2. That portion of the contents which is above the opening $a$ and between the guides B and B' will pass directly to the opening and be discharged. The rest of the contents in the meantime will be brought into position between the guides B B', just below the opening $a$, so that when the vessel is tilted in the opposite direction it will be directed to the opening and discharged. The direction of the tipping or tilting of the vessel is controlled by reference to a score or index-mark on the outside of the vessel.

It is sometimes advantageous, especially in case the discharge-opening is a large one, to remove a portion of the guides at their apexes, as shown in Figs. 3 and 4 by the guides C C', so that the contents may be brought to the opening either by tilting the vessel on line 4 4 of Fig. 4, or in a direction at right angles thereto.

Having described my invention, what I desire to claim and secure by Letters Patent is—

1. The combination, with a vessel having an opening for discharging the contents, of two or more guides arranged about the opening upon the inner surface of the vessel, whereby the contents may be directed to the opening from different directions when the vessel is tilted, as herein substantially shown and described.

2. The combination, with a vessel having an opening for discharging the contents, of two V-shaped guides secured to the inner surface of the vessel, said guides being placed on opposite sides of the opening, with their angles or apexes pointing toward it, whereby the contents may be directed to the opening from opposite directions when the vessel is tilted, as herein substantially shown and described.

EDMUND LYON.

Witnesses:
WM. W. CHAPIN,
C. D. KIDREL.